(12) United States Patent
Okutani et al.

(10) Patent No.: US 11,230,327 B2
(45) Date of Patent: Jan. 25, 2022

(54) STEERING DEVICE

(71) Applicant: Isuzu Motors Limited, Tokyo (JP)

(72) Inventors: Junpei Okutani, Fujisawa (JP);
Haruyuki Hosoya, Yokohama (JP);
Kousuke Kawakami, Yokohama (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 16/642,924

(22) PCT Filed: Jul. 18, 2018

(86) PCT No.: PCT/JP2018/026794
§ 371 (c)(1),
(2) Date: Feb. 28, 2020

(87) PCT Pub. No.: WO2019/044224
PCT Pub. Date: Mar. 7, 2019

(65) Prior Publication Data
US 2020/0223496 A1 Jul. 16, 2020

(30) Foreign Application Priority Data

Aug. 30, 2017 (JP) .............................. JP2017-165748

(51) Int. Cl.
*B62D 33/063* (2006.01)
*B62D 1/20* (2006.01)

(52) U.S. Cl.
CPC .............. *B62D 33/063* (2013.01); *B62D 1/20* (2013.01)

(58) Field of Classification Search
CPC .. B62D 33/063; B62D 33/067; B62D 5/0415; B62D 1/16
See application file for complete search history.

(56) References Cited

U.S. PATENT DOCUMENTS

| 4,452,329 A | * | 6/1984 | Stone | ................... | B62D 33/067 |
| | | | | | 180/89.15 |
| 2003/0042067 A1 | * | 3/2003 | Yanaka | ................ | B62D 5/0463 |
| | | | | | 180/446 |

(Continued)

FOREIGN PATENT DOCUMENTS

| AT | 296781 | 2/1972 |
| AT | 504680 | 7/2008 |

(Continued)

OTHER PUBLICATIONS

Uehara, Sound Insulation Structure of CAB, Jul. 5, 2012, EPO, JP 2012126296 A, Machine Translation of Description (Year: 2012).*

(Continued)

*Primary Examiner* — Paul N Dickson
*Assistant Examiner* — Matthew D Lee

(57) ABSTRACT

A steering device exhibiting improved layout properties around a steering shaft. A steering device installed in a vehicle, the vehicle compartment of which is capable of tilting, has: a first steering shaft, one end of which is connected to a steering wheel; a second steering shaft positioned below the first steering shaft and in a manner such that the one end thereof connected to the other end of the first steering shaft is located above the floor section of the vehicle compartment; and a coaxial motor which applies a rotational force to the first steering shaft and is provided in a manner such that the output shaft thereof is coaxial with the first steering shaft. Furthermore, the second steering shaft is capable of telescoping, because a shaft and a cylindrical member are connected so as to be capable of sliding relative to one another in the axial direction.

2 Claims, 2 Drawing Sheets

(56) References Cited

U.S. PATENT DOCUMENTS

| | | | |
|---|---|---|---|
| 2015/0175198 A1 | 6/2015 | Shigeta | |
| 2020/0346683 A1 * | 11/2020 | Okutani | B62D 1/189 |
| 2020/0346684 A1 * | 11/2020 | Okutani | B62D 33/067 |

FOREIGN PATENT DOCUMENTS

| | | | | |
|---|---|---|---|---|
| CN | 104487316 | | 4/2015 | |
| DE | 2330642 | | 1/1974 | |
| DE | 10249718 | | 5/2004 | |
| EP | 0955230 A2 * | | 11/1999 | B62D 33/067 |
| EP | 1985520 A1 * | | 10/2008 | B62D 5/0415 |
| EP | 3345810 A1 * | | 7/2018 | B62D 33/07 |
| FR | 1101178 A * | | 10/1955 | B62D 3/02 |
| GB | 970832 | | 9/1964 | |
| JP | 60-075168 | | 5/1985 | |
| JP | 2000247239 A * | | 9/2000 | B62D 5/0415 |
| JP | 2005-082099 | | 3/2005 | |
| JP | 2007-112240 | | 5/2007 | |
| JP | 2008247240 A * | | 10/2008 | |
| JP | 2012126296 A * | | 7/2012 | |
| JP | 2013-010380 | | 1/2013 | |
| KR | 20170035728 A * | | 3/2017 | |
| WO | WO 2012/060744 | | 5/2012 | |
| WO | WO-2012060744 A1 * | | 5/2012 | B62D 1/20 |
| WO | WO-2014098655 A1 * | | 6/2014 | B62D 6/04 |
| WO | WO 2019/044224 | | 3/2019 | |

OTHER PUBLICATIONS

International Search Report and the Written Opinion dated Sep. 25, 2018 From the International Searching Authority Re. Application No. PCT/JP2018/026794 and Its Translation of Search Report Into English. (9 Pages).

Notification of Office Action and Search Report dated Sep. 2, 2021 From the State Intellectual Property Office of the People's Republic of China Re. Application No. 201880054144.1. (6 Pages).

* cited by examiner

STEERING DEVICE

TECHNICAL FIELD

The present disclosure relates to a steering device mounted on a vehicle.

BACKGROUND ART

Conventionally, it is known that, regarding steering devices to be mounted on a vehicle, some of the steering devices include, in a vehicle cabin, a motor for applying a rotational force to a steering shaft (see, for example, Patent Literature (hereinafter, referred to as "PTL") 1).

Some of such steering devices include a motor with an output shaft disposed so as to be orthogonal or substantially orthogonal to the steering shaft, and convert the direction of the rotational force of the motor into the rotational direction of the steering shaft by a worm wheel mechanism.

CITATION LIST

Patent Literature

PTL 1
Japanese Patent Application Laid-Open No. 2007-112240

SUMMARY OF INVENTION

Technical Problem

However, because the motor needs to be arranged so as not to interfere with various devices (for example, a parking brake, a switch panel, and the like) disposed around the steering shaft in the conventional steering devices described above, the conventional steering devices have room for improvement in terms of the layout quality around the steering shaft.

An object of the present disclosure is to provide a steering device which makes it possible to improve the layout quality around a steering shaft.

Solution to Problem

The steering device according to one aspect of the present disclosure is a steering device to be mounted on a vehicle having a tiltable vehicle cabin, the steering device including: a first steering shaft connected at one end to a steering wheel; a second steering shaft disposed below the first steering shaft and connected at one end to another end of the first steering shaft, the one end of the second steering shaft being located above a floor of the vehicle cabin; and a coaxial motor including an output shaft arranged coaxially with the first steering shaft, the coaxial motor applying a rotational force to the first steering shaft, in which the second steering shaft is extendible and retractable in an axial direction.

Advantageous Effects of Invention

According to the present disclosure, it is possible to improve the layout quality around the steering shaft.

DESCRIPTION OF EMBODIMENT

Hereinafter, an embodiment of the present disclosure will be described in detail with reference to the accompanying drawings.

Figure 1:
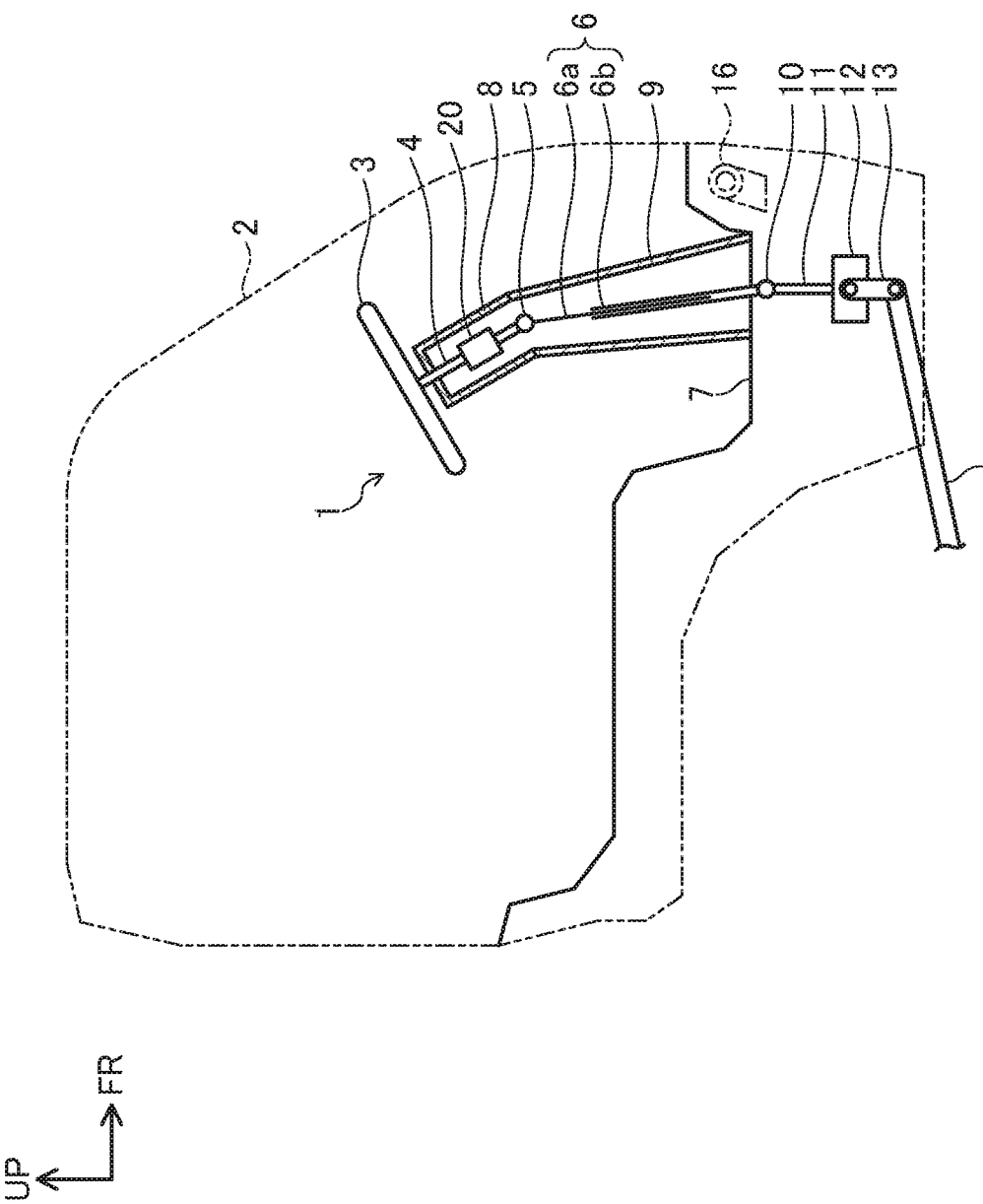
FIG. 1 schematically illustrates one example of a steering device according to an embodiment of the present disclosure.

Steering device 1 according to the present embodiment will be described with reference to FIG. 1. FIG. 1 schematically illustrates steering device 1 according to the present embodiment. In FIG. 1, FR indicates the front side of a vehicle, and UP indicates the upper side of the vehicle.

Steering device 1 is mounted on a vehicle provided with vehicle cabin 2 (what is called a "cab" or "cabin"). The vehicle is a cab-over type vehicle (for example, a truck, a bus, a van, or the like) provided with vehicle cabin 2 above an internal combustion engine (not illustrated).

Figure 2:
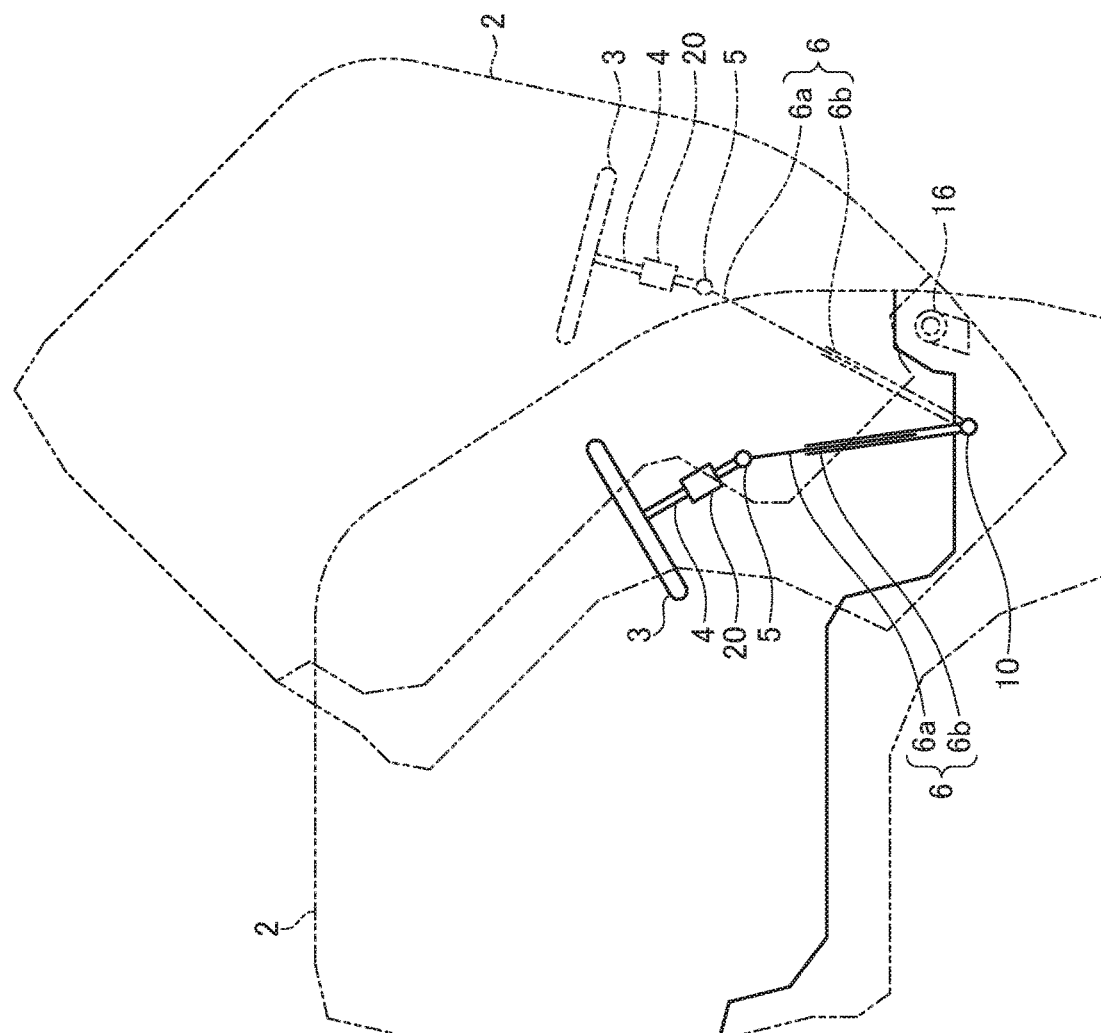
FIG. 2 schematically illustrates one example of the state of the steering device during cab tilting according to the embodiment of the present disclosure.

The vehicle is capable of cab tilting. That is, it is possible to rotate vehicle cabin 2 around tilt shaft 16 as shown in FIG. 2. Tilt shaft 16 is fixed, for example, to a front end portion of a chassis frame (not illustrated) disposed to extend in the front-rear direction of the vehicle. Note that, illustration of some of the components shown in FIG. 1 is omitted in FIG. 2.

Steering device 1 includes steering wheel 3, first steering shaft 4, first joint part 5, second steering shaft 6, second joint part 10, third steering shaft 11, power steering unit 12, pitman arm 13, drag link 14, and coaxial motor 20.

Steering wheel 3 is a device with which a driver performs a rotating operation for steering the vehicle.

First steering shaft 4 is a rotatable rod-like member, and is connected at one end to steering wheel 3 and connected at the other end to first joint part 5.

First joint part 5 couples first steering shaft 4 to second steering shaft 6 at a predetermined angle.

First steering shaft 4 is covered peripherally by a cylindrical upper cover (also referred to as a steering cowl) 8. Meanwhile, first joint part 5 is covered peripherally by a cylindrical lower cover (also referred to as a column cover or a column boot) 9. The upper end of lower cover 9 is connected to the lower end of upper cover 8, and the lower end of lower cover 9 is fixed to the floor (bottom) 7 of vehicle cabin 2.

Second steering shaft 6 is a rotatable rod-like member. Second steering shaft 6 includes shaft 6a and cylindrical member 6b surrounding shaft 6a, which are coupled together so as to be relatively slidable in the axial direction, making second steering shaft 6 extendible and retractable, for example. Thus, second steering shaft 6 extends when the cab tilting is performed (see FIG. 2) and retracts when the cab tilting is not performed (see FIG. 1).

Note that, although the case where second steering shaft 6 has a two-layer structure has been described as an example for the present embodiment, second steering shaft 6 may also have a three- or more layer structure by providing three or more cylindrical members 6b.

Second steering shaft 6 is connected at one end to first joint part 5 and connected at the other end to second joint part 10 disposed below floor 7 (outside vehicle cabin 2). Specifically, the other end of second steering shaft 6 is inserted into an opening (not illustrated) formed in floor 7 and connected to second joint part 10.

Second joint part 10 couples second steering shaft 6 to third steering shaft 11 at a predetermined angle.

A portion of second steering shaft 6 located above floor 7 (portion located in vehicle cabin 2) is covered peripherally by lower cover 9.

Third steering shaft 11 is a rotatable rod-like member, and is connected at one end to second joint part 10 and connected at the other end to power steering unit (also referred to as steering gearbox) 12.

The rotational force of steering wheel 3 is transmitted to power steering unit 12 via first steering shaft 4, second steering shaft 6, and third steering shaft 11.

Power steering unit 12 converts the rotational force transmitted as described above into a larger force that swings pitman arm 13. Thus, pitman arm 13 swings to push or pull drag link 14, so that wheels (not illustrated) are steered via knuckle arms and tie rods (both not illustrated).

Here, a description will be given of a characteristic configuration of the present embodiment.

In the present embodiment, coaxial motor 20 is attached to first steering shaft 4 as shown in FIG. 1. Coaxial motor 20 is housed in upper cover 8.

An output shaft (not illustrated) of coaxial motor 20 is arranged coaxially with first steering shaft 4. Coaxial motor 20 is driven under the control of an ECU (not illustrated) to apply the rotational force to first steering shaft 4.

For example, when a driving assistance function is executed, the ECU drives coaxial motor 20 such that a predetermined level of rotational force is applied to first steering shaft 4 at a predetermined timing. Examples of the driving assistance function include automatic parking, lane keeping assist during cruise control, and the like.

The rotational force of first steering shaft 4 caused by driving of coaxial motor 20 is transmitted to power steering unit 12 via second steering shaft 6 and third steering shaft 11.

As described above, steering device 1 according to the present embodiment is characterized in that first steering shaft 4 is provided with coaxial motor 20. Since coaxial motor 20 can be disposed without interfering with various devices (for example, a parking brake, a switch panel, and the like) provided around the steering shaft, steering device 1 of the present embodiment allows improvement in layout quality around the steering shaft.

Further, if coaxial motor 20 is provided on shaft 6a of second steering shaft 6, cylindrical member 6b is shortened by the length of coaxial motor 20 provided, so that it may be impossible to ensure the length of second steering shaft 6 required for the cab tilting. In contrast, coaxial motor 20 is provided on first steering shaft 4 disposed above second steering shaft 6 in steering device 1 according to the present embodiment, so that it is possible to ensure the length of second steering shaft 6 required for the cab tilting.

The present disclosure is not limited to the above-described embodiments, and can be appropriately modified and implemented without departing from the spirit of the present disclosure. Hereinafter, each modification will be described.

Modification 1

Steering device 1 only have to include, as its minimum configuration, coaxial motor 20 and a steering shaft (first steering shaft 4 or second steering shaft 6) to which coaxial motor 20 is attached.

Modification 2

Although the embodiment has been described in relation to the case where the vehicle on which steering device 1 is mounted is the cab-over type vehicle, the present disclosure is not limited to this example. Steering device 1 may also be mounted on a vehicle provided with an internal combustion engine in front of or behind tiltable vehicle cabin 2.

SUMMARY OF DISCLOSURE

The steering device according to the present disclosure is a steering device to be mounted on a vehicle having a tiltable vehicle cabin, the steering device including: a first steering shaft connected at one end to a steering wheel; a second steering shaft disposed below the first steering shaft and connected at one end to another end of the first steering shaft, the one end of the second steering shaft being located above a floor of the vehicle cabin; and a coaxial motor including an output shaft arranged coaxially with the first steering shaft, the coaxial motor applying a rotational force to the first steering shaft, in which the second steering shaft is extendible and retractable in an axial direction.

In the steering device described above, the second steering shaft may include a shaft and a cylindrical member surrounding the shaft, the shaft and the cylindrical member being coupled together so as to be relatively slidable in the axial direction.

This application is based on Japanese Patent Application No. 2017-165748, filed on Aug. 30, 2017, the disclosure of which is incorporated herein by reference in its entirety.

INDUSTRIAL APPLICABILITY

The steering device of the present disclosure is applicable to a steering device of a vehicle.

REFERENCE SIGNS LIST

1 Steering device
2 Vehicle cabin
3 Steering wheel
4 First steering shaft
5 First joint part
6 Second steering shaft
6a Shaft
6b Cylindrical member
7 Floor
8 Upper cover
9 Lower cover
10 Second joint part
11 Third steering shaft
12 Power steering unit
13 Pitman arm
14 Drag link
16 Tilt shaft
20 Coaxial motor

What is claimed is:

1. A steering device to be mounted on a vehicle having a tiltable vehicle cabin, the steering device comprising:
   a first steering shaft connected at one end to a steering wheel;
   a second steering shaft disposed below the first steering shaft and connected at one end to another end of the first steering shaft via a first joint part, the one end of the second steering shaft being located above a floor of the tillable vehicle cabin;
   a third steering shaft connected to another end of the second steering shaft via a second joint part disposed below the floor; and a coaxial motor including an output shaft arranged coaxially with the first steering shaft, the coaxial motor applying a rotational force to the first steering shaft, a cylindrical upper cover covering peripherally the first steering shaft; and a cylindrical lower cover having an upper end connected to a lower end of the upper cover and a lower end fixed to the floor of the vehicle cabin, wherein the second steering shaft is extendible and retractable in an axial direction.

2. The steering device according to claim 1, wherein the second steering shaft includes a shaft and a cylindrical member surrounding the shaft, the shaft and the cylindrical member being coupled together so as to be relatively slidable in the axial direction.

* * * * *